(12) United States Patent
LaFurge, Jr.

(10) Patent No.: US 9,200,659 B1
(45) Date of Patent: Dec. 1, 2015

(54) TRUCK BED LOCK

(71) Applicant: Nelson C. LaFurge, Jr., Highland Falls, NY (US)

(72) Inventor: Nelson C. LaFurge, Jr., Highland Falls, NY (US)

( * ) Notice: Subject to any disclaimer, the term of this patent is extended or adjusted under 35 U.S.C. 154(b) by 188 days.

(21) Appl. No.: 14/149,011

(22) Filed: Jan. 7, 2014

(51) Int. Cl.
*E05C 5/02* (2006.01)
*F16B 21/02* (2006.01)

(52) U.S. Cl.
CPC ........................... *F16B 21/02* (2013.01)

(58) Field of Classification Search
USPC ...................................... 292/58–62
See application file for complete search history.

(56) References Cited

U.S. PATENT DOCUMENTS

| 4,249,684 | A | 2/1981 | Miller et al. |
| 5,947,356 | A | 9/1999 | Delong |
| 7,641,156 | B2 * | 1/2010 | Medders ................ A47B 81/04 |
| | | | 211/203 |

* cited by examiner

*Primary Examiner* — Mark Williams
(74) *Attorney, Agent, or Firm* — Crossley Patent Law

(57) ABSTRACT

A truck bed lock that includes an outer shell, an inner casing disposed therein, and an internal shaft within the inner casing. A locking rod slidingly engages the internal shaft and a bottom compartment in the inner casing beneath the internal shaft. A quartet of spring-loaded legs, pivotably attached to a base of the locking rod, are maintained in a retracted position within the bottom compartment when the locking rod is extended for insertion through a hole in each of a tool box and a truck bed. Thereafter, the locking rod is retracted into the internal shaft and thereupon, the legs extend through a lower opening in the bottom compartment into a locked position parallel to a lower end of the outer shell with the legs being co-planar with one another adjoining the base of the locking rod to secure the tool box against the truck bed.

6 Claims, 3 Drawing Sheets

TRUCK BED LOCK

BACKGROUND OF THE INVENTION

Various types of truck bed locks are in use and are known in the prior art. However, what is needed is a truck bed lock that is adaptable and easy to use, but at the same time, provides a strong yet removable connection between an item, such as tool box, to be secured to a truck bed.

FIELD OF THE INVENTION

The present invention relates to a truck bed lock, and more particularly, to a truck bed lock that provides improved structural features and functionally over prior truck bed locks.

SUMMARY OF THE INVENTION

The general purpose of the present truck bed lock, described subsequently in greater detail, is to provide a truck bed lock which has many novel features that results in a truck bed lock which is not anticipated, rendered obvious, suggested, or even implied by prior art, either alone or in combination thereof.

The present truck bed lock includes an outer shell and an inner casing that is located inside the outer shell. An internal shaft is centrally disposed within the inner casing. A locking rod is centrally disposed within the internal shaft. A fixed handle is disposed on an uppermost end of the locking rod. A quartet of spring-loaded legs is pivotally attached to a base disposed on a lowermost end of the locking rod. The legs are maintained in a retracted position within a bottom compartment disposed within the inner casing in a position beneath the internal shaft 16 upon disposition of the locking rod in a fully extended position in which the locking rod is extended away form the top end of the inner casing. Upon retraction of the locking rod into the internal shaft, however, the legs extend out of a lower opening in the bottom compartment into a position parallel to the bottom end adjoining the base of the locking rod. Upon extension of the locking rod base through a hole in a tool box and a hole in the truck bed which is then followed by the extension of the legs, the truck bed lock secures the tool box in place against the truck bed until further action is performed by a user.

The present device eliminates the need for wrenches, nuts, and bolts or other tools that can be required in order to secure a tool box or other item to a truck bed. The present device is provided in a wide range of sizes to accommodate differently sized truck caps.

Thus has been broadly outlined the more important features of the present truck bed lock so that the detailed description thereof that follows may be better understood and in order that the present contribution to the art may be better appreciated.

DETAILED DESCRIPTION OF THE DRAWINGS

Figure 1:
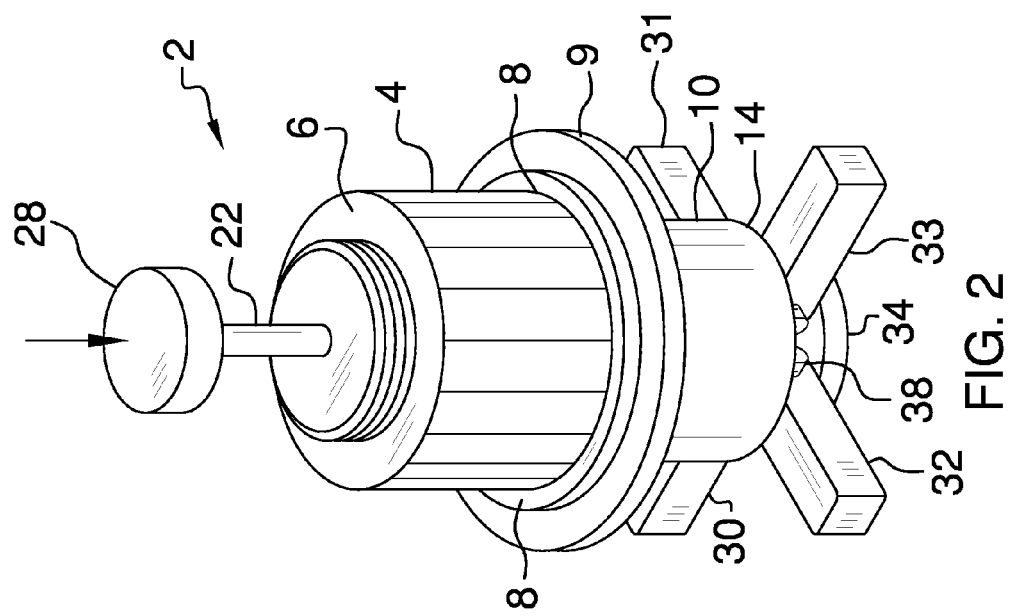
FIG. 1 is a perspective view of the truck bed lock as it would appear with each leg of the quartet of legs in a retracted position and located within the bottom mounted compartment on the inner casing.
Figure 2:
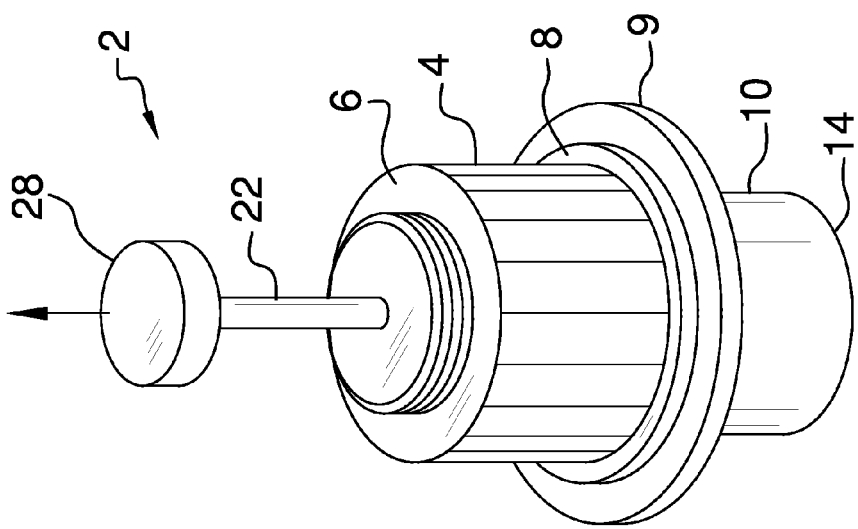
FIG. 2 is a perspective view of the truck bed lock as it would appear with each leg of the quartet of legs in an extended position, having been pushed out of the bottom mounted compartment on the inner casing.
Figure 4:
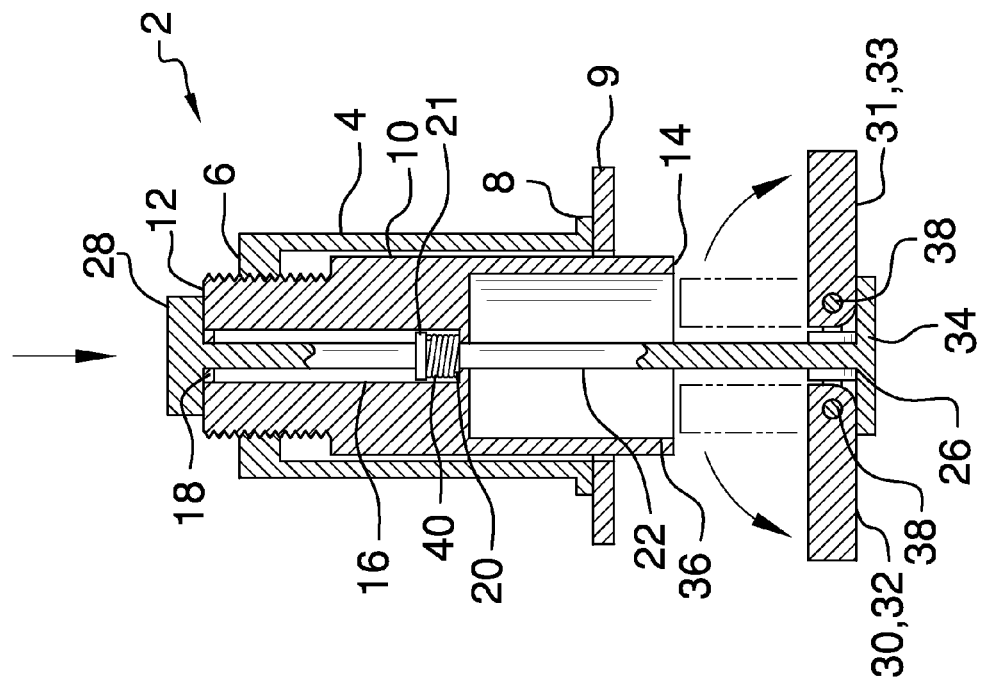
FIG. 4 is a side cutaway view of the truck bed lock as it would appear with each leg of the quartet of legs in an extended position, having been pushed out of the bottom mounted compartment on the inner casing.

With reference now to the drawings, and in particular FIGS. 1 through 5 thereof, an example of the truck bed lock employing the principles and concepts of the present invention and generally designated by the reference number 2 will be described.

Referring to FIGS. 1 through 5, the present invention 2 is disclosed. The present truck bed lock 2 includes an outer shell 4 that has an upper end 6 and a lower end 8, with a flange 9, which can be disc-shaped as shown, that is attached to the lower end 8 of the outer shell 4 and has a wider diameter than the outer shell 4. Inner casing 10 is mostly disposed within the outer shell 4 and has an top end 12 and a bottom end 14, with a portion of the top end 12 extending outwardly from the upper end 6 of the outer shell 4. An internal shaft 16, with an upper edge 18 and a lower edge 20, is located within the inner casing 10. A locking rod 22, having an uppermost end 24 and a lowermost end 26, is also provided. The locking rod 22 is centrally disposed along a longitudinal midline axis of the internal shaft 16. The uppermost end 24 is extendible through the upper edge 18 of the internal shaft 16. The outer shell 4 can have a cylindrically-shape as shown or other shape that promotes the functionality of the device.

A handle 28 is disposed on the uppermost end 24 of the locking rod 22. A base 34 is disposed on the lowermost end of the locking rod 22. The locking rod 22 slidingly engages the internal shaft 16 and the bottom compartment 36. A bottom compartment 36, which has a lower opening 37, is centrally disposed within the inner casing 10 in a position beneath the internal shaft 16. The lowermost end 26 of the locking rod 22 is extendible from the bottom compartment 36 lower opening 37. A quartet of spring-loaded legs 30-33 is pivotally attached to the base 34. The legs 30-33 are disposed in a retracted position within the bottom compartment 36 upon the disposition of the locking rod 22 in a fully extended position in which the locking rod 22 is extended away from the top end of the inner casing 10. Conversely, the legs 30-33 are disposed in an extended position outside of the bottom compartment 36 in a position parallel to the bottom end 14 against the base upon the retraction of the locking rod 22 into the internal shaft 16. A spring-loaded pivot mechanism 38 disposed on each spring-loaded leg 30-33 proximal the locking rod is in operational communication with one of the respective legs and extends the respective leg 30-33 out of the lower opening 37 until all of the legs 30-33 are co-planar with one another and rest against the base 34 of the locking rod 22.

Figure 3:
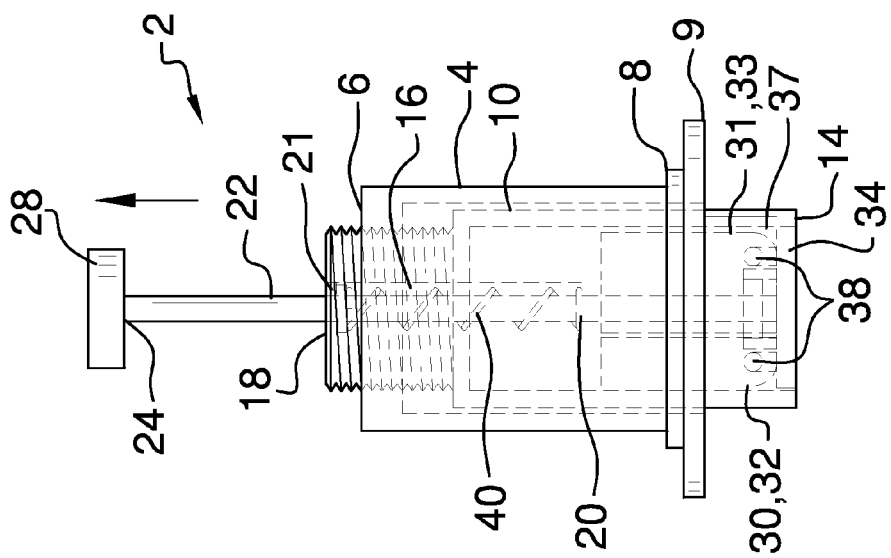
FIG. 3 is a side view of the truck bed lock as it would appear with each leg of the quartet of legs in a retracted position and located within the bottom mounted compartment on the inner casing with the internal components shown as dashed lines.
Figure 5:
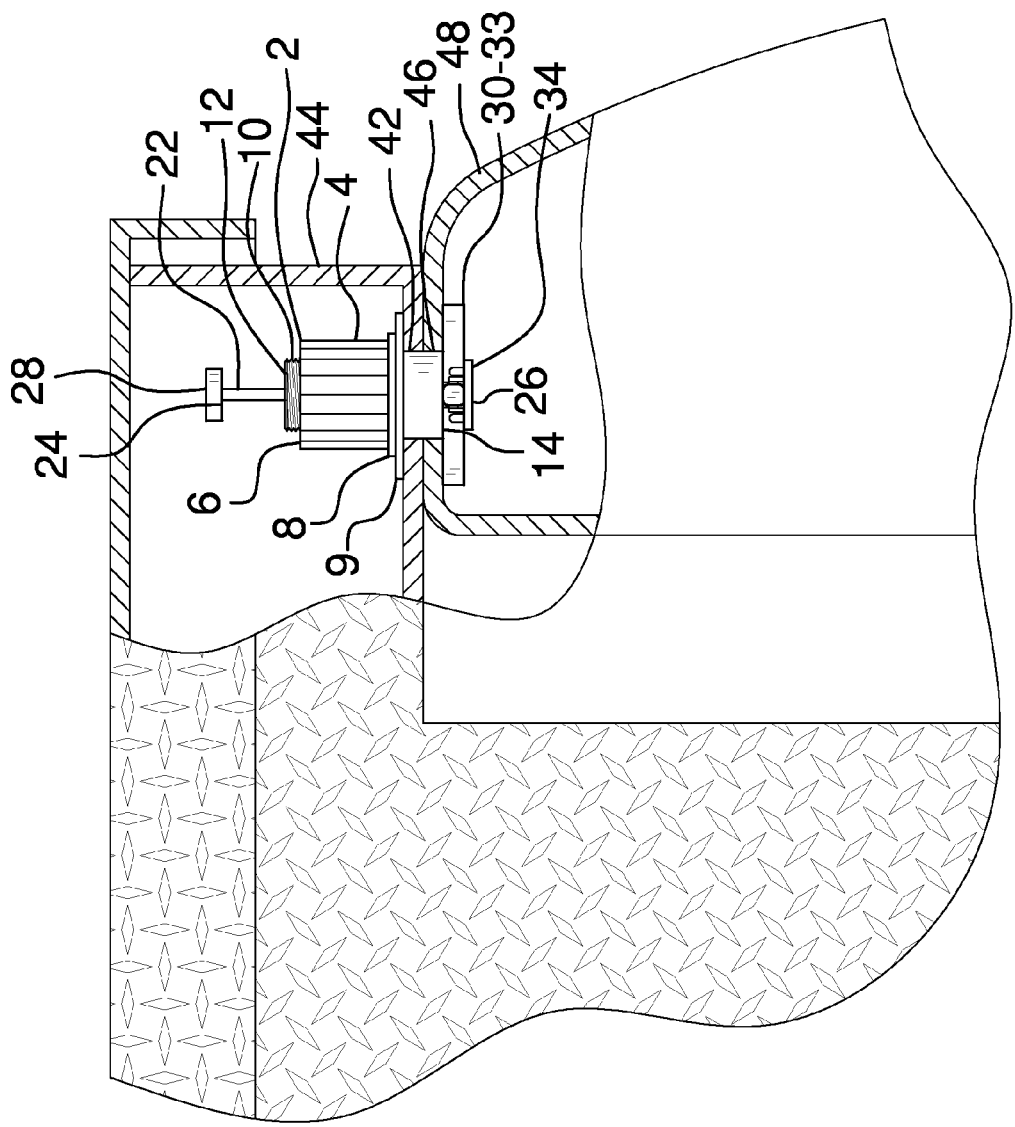
FIG. 5 is a side view of the truck bed lock as it would appear in use, holding a tool box to a truck bed.

A tension second spring 40 surrounds the locking rod 22 within the internal shaft 16. The second spring 40 maintains the locking rod 22 in an extended position in which the second spring 40 is wedged against the lower edge 20 of the internal shaft 16 and an upper spring support 21 fixedly attached to a set position on the locking rod 22. Upon the extension of the locking rod 22, the legs 30-33 are located within the bottom compartment 36, as shown in FIGS. 1 and 3.

Upon extension of the extended locking rod 22 base 34 through a hole 42 in a tool box 44 and a hole 46 in a truck bed 48 which is followed by the extension of the legs 30-33 through the bottom compartment 36 lower opening, the truck bed lock 2 locks the tool box 44 in place against the truck bed 48 until further action is performed by a user because each of the four legs 30-33 are co-planar with one another and rest against the base 34 of the locking rod 22. After this has been performed and any downward pressure on the handle 28 is released, the second spring 40 disposed within the internal shaft 16 that surrounds the locking rod 22 engages and presses against the upper spring support 21, serving to narrow and eliminate any gap between the legs 30-33 and the truck bed 48 thereby providing pressure to secure the tool box 44 against the truck bed 48.

The invention claimed is:

1. A truck bed lock comprising:
   an outer shell having an upper end and a lower end, the outer shell further having a diameter;
   an inner casing disposed mostly within the outer shell, the inner casing having an top end and a bottom end, a portion of the top end extending outwardly from the upper end of the outer shell;
   an internal shaft centrally disposed within the inner casing, the internal shaft having an upper edge and a lower edge;
   a locking rod having an uppermost end and a lowermost end, the locking rod being centrally disposed along a longitudinal midline axis of the internal shaft, the uppermost end being extendible through the upper edge of the internal shaft;
   a bottom compartment centrally disposed within the inner casing in a position beneath the internal shaft, the bottom compartment having a lower opening, the lowermost end of the locking rod being extendible from the bottom compartment lower opening;
   a base disposed on the lowermost end of the locking rod;
   a plurality of spring-loaded legs pivotally attached to the base;
   a spring-loaded pivot mechanism disposed on each of the legs proximal the locking rod;
   an upper spring support fixedly attached to the locking rod;
   a tension second spring disposed within the internal shaft between the lower edge of the internal shaft and the upper spring support in a position surrounding the locking rod;
   wherein the second spring is configured to maintain the locking rod in an extended position, wherein in a fully extended position of the locking rod the second spring is wedged against the lower edge of the internal shaft and the upper spring support is attached to a set position on the locking rod and wherein the legs are disposed in a retracted position within the bottom compartment;
   wherein the legs are disposed in the retracted position within the bottom compartment upon disposition of the locking rod in the fully extended position in which the locking rod is extended away from the top end of the inner casing; and
   wherein the legs are disposed outside of the bottom compartment in an extended position in which the legs are disposed in a position parallel to the bottom end against the base upon the retraction of the locking rod into the internal shaft.

2. The truck bed lock according to claim 1 wherein the truck bed lock further comprises:
   a flange attached to the lower end of the outer shell; wherein the flange has a wider diameter than a diameter of the outer shell.

3. The truck bed lock according to claim 2 wherein the plurality of legs pivotally attached to the base comprises a quartet of legs.

4. The truck bed lock according to claim 3 wherein the truck bed lock further comprises a handle disposed on the uppermost end of the locking rod.

5. A truck bed lock comprising:
   an outer shell having an upper end and a lower end, the outer shell further having a diameter;
   a flange attached to the lower end of the outer shell, wherein the flange has a wider diameter than a diameter of the outer shell;
   an inner casing disposed mostly within the outer shell, the inner casing having an top end and a bottom end, a portion of the top end extending outwardly from the upper end of the outer shell;
   an internal shaft centrally disposed within the inner casing, the internal shaft having an upper edge and a lower edge;
   a locking rod having an uppermost end and a lowermost end, the locking rod being centrally disposed along a longitudinal midline axis of the internal shaft, the uppermost end being extendible through the upper edge of the internal shaft;
   a handle disposed on the uppermost end of the locking rod;
   a bottom compartment centrally disposed within the inner casing in a position beneath the internal shaft, the bottom compartment having a lower opening, the lowermost end of the locking rod being extendible from the bottom compartment lower opening;
   a base disposed on the lowermost end of the locking rod;
   a plurality of spring-loaded legs pivotally attached to the base;
   a spring-loaded pivot mechanism disposed on each of the legs proximal the locking rod;
   an upper spring support fixedly attached to the locking rod;
   a tension second spring disposed within the internal shaft between the lower edge of the internal shaft and the upper spring support in a position surrounding the locking rod;
   wherein the second spring is configured to maintain the locking rod in an extended position, wherein in a fully extended position of the locking rod the second spring is wedged against the lower edge of the internal shaft and the upper spring support is attached to a set position on the locking rod and wherein the legs are disposed in a retracted position within the bottom compartment;
   wherein the legs are disposed in the retracted position within the bottom compartment upon disposition of the locking rod in the fully extended position in which the locking rod is extended away from the top end of the inner casing;
   wherein the legs are disposed outside of the bottom compartment in an extended position in which the legs are disposed in a position parallel to the bottom end against the base upon the retraction of the locking rod into the internal shaft.

6. The truck bed lock according to claim 5 wherein the plurality of legs pivotally attached to the base comprises a quartet of legs.

* * * * *